United States Patent [19]

Stewart

[11] Patent Number: 4,514,902
[45] Date of Patent: May 7, 1985

[54] FOOD POUCH OPENING DEVICE

[76] Inventor: James F. Stewart, 13153 Horseshoe Bend Rd., Boise, Id. 83703

[21] Appl. No.: 578,446

[22] Filed: Feb. 9, 1984

[51] Int. Cl.³ ............................................. B65D 35/28
[52] U.S. Cl. ............................................. 30/2; 7/132; 222/103
[58] Field of Search .............. 30/2, 123, 124; 222/95, 222/103; 7/151, 156, 132, 126, 135

[56] References Cited

U.S. PATENT DOCUMENTS

| 2,881,521 | 4/1959 | Mito | 30/2 |
| 2,903,161 | 9/1959 | Stahmer | 222/103 X |
| 3,142,074 | 7/1964 | Reich | 7/135 |
| 3,387,366 | 6/1968 | Whitman | 30/2 |
| 3,774,251 | 11/1973 | Pellman | 7/132 |
| 3,993,220 | 11/1976 | Troy | 222/95 |
| 4,273,258 | 6/1981 | Stevenson | 222/103 |

Primary Examiner—Jimmy C. Peters
Attorney, Agent, or Firm—Paul F. Horton

[57] ABSTRACT

A device for opening food pouches including a spring loaded handle provided with stripping rods and a pouch cutter. The stripping rods pivotally engage one another so that a heated food pouch may be grasped by the opening device in tongs-like manner. The stripping rods include opposing smooth planar abutting surfaces for stripping food away from the end of the pouch to be opened. A cutting blade, preferably hook-shaped in configuration and mounted adjacent the free end of one of the stripping rods is operable to slit the pouch, while the pouch is still in the grasp of the stripping rods, by retraction of the device relative to the pouch.

8 Claims, 4 Drawing Figures

FOOD POUCH OPENING DEVICE

BACKGROUND OF THE INVENTION

1. Field of the Invention

This invention relates, in general, to bag, pouch, and carton opening devices, and in particular to devices used for stripping and cutting food pouches.

2. Description of the Prior Art

In recent years, and thanks largely to technology spawned by the "space age" many foods are now packaged in a foil pouch. The so-called "retort" package, a sealed foil pouch, and process were developed for space missions but are now used largely in the home. Such food pouches require no refrigeration, freezing, or preservatives to maintain freshness and have a shelf life of from two to five years or more. In preparing a meal from the pouch, the pouch is placed in boiling water for heating; retrived from the water and opened by cutting the bag. The primary problem associated with the food pouch is the messiness and loss of food in the pouch opening operation. Liquified foods or foods packaged in a liquid present a spilling problem when the pouch is cut. This is particularly a problem because of the high temperature of the food and liquid. Separate tools, such as tongs or forceps, are often used for retrieving the bag from the boiling water; other tools or objects are often used in attempting to strip the food and liquid from the area of the pouch to be cut; and yet another tool such as knife or scissors is used to cut the pouch. Exchanging tools during such operation permit the liquids to flow to areas of the pouch to be cut with resultant spill and loss of the food.

Culinary tongs, as typified by U.S. Pat. No. 1,846,619 issued to S. Speirs, have long been used in the art. Devices for stripping food pouches are known in the art and film slitters as typified by patents to K. Mito, U.S. Pat. No. 2,881,520 and to J. C. Whitman, U.S. Pat. No. 3,387,366 are also in the art. While useful for their designed purposes, none of the tools solve the problem of food spillage from food pouches during th pouch-opening procedure.

SUMMARY OF THE INVENTION

The present invention solves the spillage problem by providing a food pouch opening device which not only serves as a food pouch retrieving tongs but also strips food and liquid away from the pouch area to be cut and then, without removal of the tool permits the pouch to be cut while still serving as a clamp on the uncut portion of the pouch.

This procedure is accomplished by the pouch opening device of the present invention which includes spring loaded stripping rods which retrieve a food pouch from boiling water in a tongs-like manner; smooth, abutting rod surfaces which strip food from the portion of the bag to be cut, and a hook shaped cutting member disposed at the free end of one of the rods for cutting the pouch while still in the liquid occluding grasp of the rods upon retraction of the device relative to the food pouch. A more thorough description of the device may be found in the appended claims.

It is therefore a primary object of the present invention to provide a food pouch opening device which is operable to retrieve a food pouch from boiling water, which is provided with manually controllable stripping rods for stripping food away from the area of a pouch to be cut; which provides a cutting blade to cut the pouch while wtill in the liquid restraining grasp of the stripping rods; and which is useable to strip all food from the pouch, once opened.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
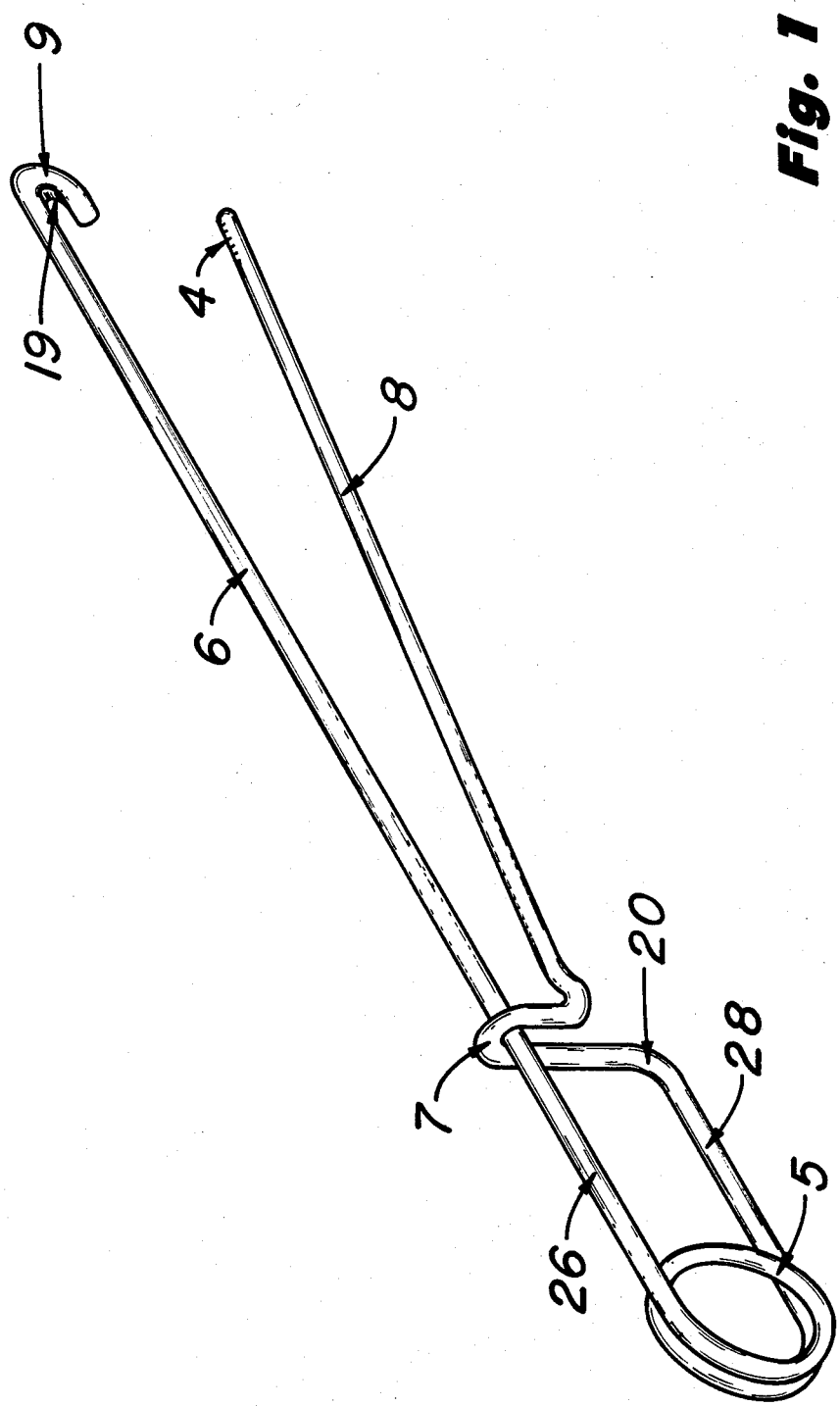
FIG. 1 is an elevated perspective view of a preferred embodiment of the present invention.
Figure 2:
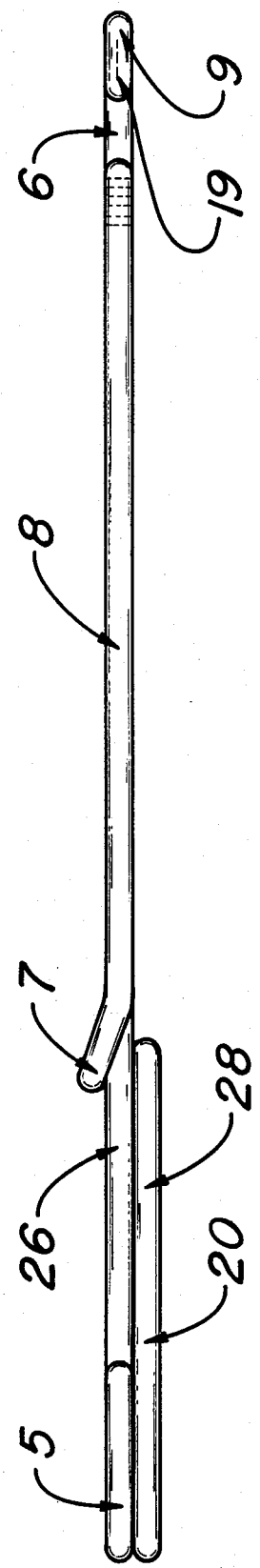
FIG. 2 is a plan view of the device of FIG. 1.
Figure 3:
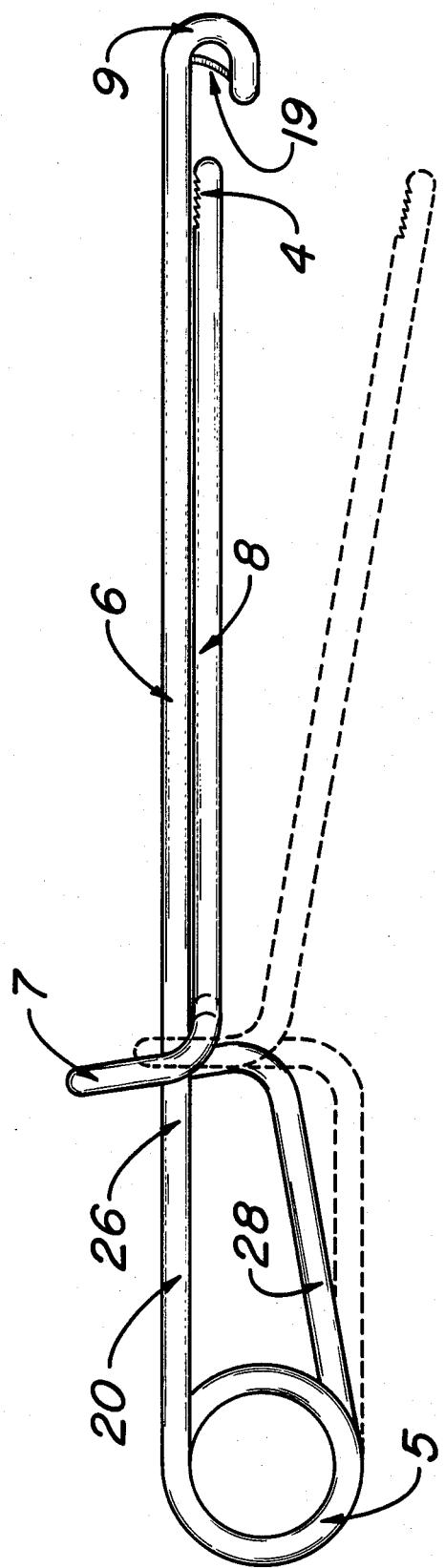
FIG. 3 is a side view of the device of FIG. 1, showing the device in a closed stipping position and in an open grasping position as illustrated by broken lines.

Referring now to the drawings, an embodiment to be preferred of a food pouch opening device 10, made according to the present invention is disclosed. Device 10 includes a handle designated generally by the numeral 20, a pair of stripping rods 6 and 8, cutting means 9, and a compression spring 5.

Device 10, except as to the cutting blade, is preferably made of unitary construction from a single piece of smooth cylindrical spring wire. From each end of a spring loop 5, a pair of arms 26 and 28 extend for a distance of approximately four inches to form a handle 20. Arm 26 projects rectilinearly to form a top stripping rod 6, about seven inches in length. Arm 28 is bent upwardly a distance of about one and one-half inches and is looped downwardly and inwardly to form a retainer 7 and then continues as lower stripping rod 8, vertically aligned with and substantially parallel to top stripping rod 6, terminating approximately one-half inch short of the end of rod 6. Rod 8 may be provided with a plurality of upwardly projecting teeth 4, notched into the wire, for superior grasping when device 10 is used as tongs. While the compression spring is preferably located at one end of the device and is unitary in construction, it is obvious that other types of compression springs could be used and at other locations relative to the pivoting stripping rods. Likewise, a variety of retainers, non-integral with the rods, could similarly be constructed to serve the same retaining function.

Cutting means 9 is preferably hook-shaped in its overall configuration to prevent slippage when retracted relative to the pouch during the cutting procedure. In the embodiment shown, top stripping rod 6 terminates in a hook supporting a cutting blade 19. Cutting blade 19 presents a sharpened cutting surface rearwardly extending from bottom to top and terminating coplanar with the lowermost abutment surface of stripping rod 6.

Figure 4:
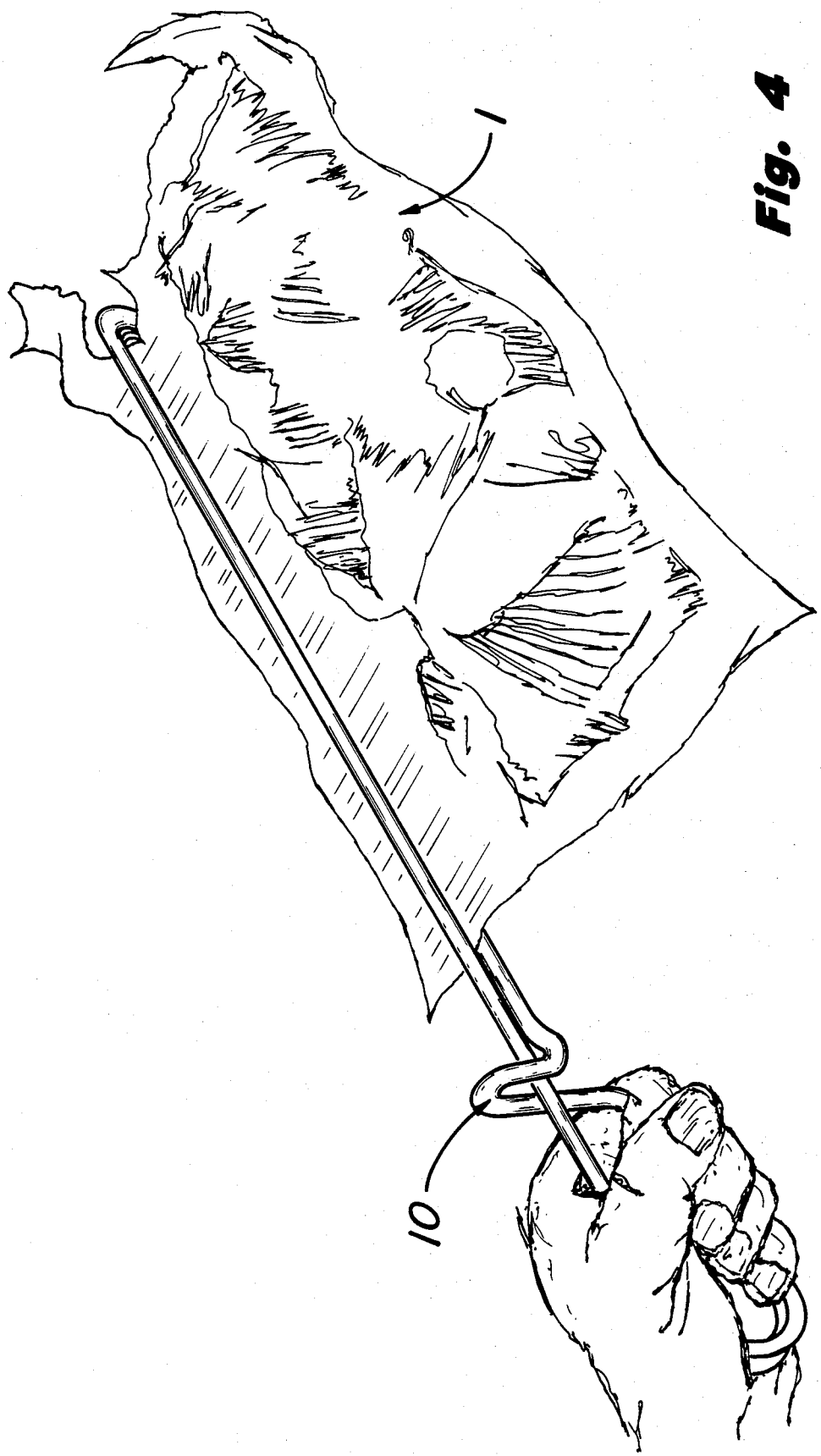
FIG. 4 is a perspective view of the device, shown cutting a food pouch.

In operation, a food pouch which has been heated is taken either from a microwave oven or a pot of boiling water by grasping the pouch 1 with device 10 in a tongs-like manner with the pouch being grasped between the two stripping rods 6 and 8. Moderate pressure, squeezing arms 26 and 28 of handle 20 toward one another overcomes the pressure exerted by spring 5 enabling the pouch to be held by the rods. Teeth 4 may assist in the grasping action. The food contents, with any liquid present, is then stripped from one end toward the other of the vacuum sealed pouch and the pouch opening device 10 is then returned to the empty side of the pouch as shown to advantage in FIG. 4. With device 10 still in a stripping position and lightly grasping the pouch, the device is retracted with the sharpened edge of cutting blade 19 engaging the foil pouch at a substantially right angle to the plane of the walls of the pouch to cut an end strip from the pouch. It is to be noted that in the cutting operation, the abutting surfaces of the two stripping rods continue to prevent food and liquid from entering the previously stripped area of the pouch. Once the cut is completed, the stripping rods are closed to engage the pouch at the far full end of the pouch to strip all food and liquids into a serving bowl in an efficient and food saving manner. While the illustration has been with food pouches, it is obvious that the procedure may be used with other types of pouches, bags, and cartons.

Having thus described in detail a preferred embodiment of the present invention, it is to be appreciated and will be apparent to those skilled in the art that physical changes can be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are thefore to be embraced therein.

I claim:

1. A food pouch opening device comprising:
   a handle;
   a pair of stripping rods affixed to said handle, and pivotaly moveable in relationship to one another from a closed to open position, said rods operable to clampingly engage a food pouch to tongs-like manner, and said rods having parallel abutting surfaces when in the closed position for stripping contents from a food pouch; and
   cutting means affixed to at least one of said rods adjacent the terminal free end thereof, said cutting means operable to cut a food pouch for emptying the contents thereof.

2. The apparatus as described in claim 1 further comprising a compression spring connected to said rods to maintain said rods in a normally open position.

3. The apparatus as described in claim 1 wherein said handle and said stripping rods are unitary in construction.

4. The apparatus as described in claim 1 wherein said cutting means is hook-like in construction, including a cutting blade, a portion of said blade being coplanar with the abutment surface of the stripping rod to which it is attached for cutting the food pouch upon retraction of the device relative to the pouch.

5. A pouch opening device comprising:
   a handle having two arms pivotally joined by a spring coil; a pair of rods, each rod connected to a respective arm of said handle; each rod provided with a smooth surface for abuttment of the opposing rod; and
   a cutting blade attached to the free terminal end of one of said rods, said blade operable to engage and slit a pouch placed between said stripping rods upon retraction of the device relative to the pouch when said stripping rods are in close apposition.

6. The apparatus as described in claim 5 wherein said rods are integral with said handle.

7. The apparatus as described in claim 5 wherein said cutting blade is hook-shaped in construction to engage the pouch substantially perpendicular to the plane of the walls of the pouch when said pouch is placed between said rods.

8. The apparatus as described in claim 5 wherein one of said rods is provided with a latch to restrict displacement of said rods relative to one another.

* * * * *